(12) United States Patent
Hachisuka et al.

(10) Patent No.: US 10,403,867 B2
(45) Date of Patent: Sep. 3, 2019

(54) BATTERY DEVICES

(71) Applicant: MAKITA CORPORATION, Aichi (JP)

(72) Inventors: Tomohiro Hachisuka, Aichi-ken (JP); Shinsuke Okuda, Aichi-ken (JP); Yuichi Sugiura, Aichi-ken (JP); Syusuke Ito, Aichi-ken (JP)

(73) Assignee: MAKITA CORPORATION, Aichi (JP)

( * ) Notice: Subject to any disclaimer, the term of this patent is extended or adjusted under 35 U.S.C. 154(b) by 356 days.

(21) Appl. No.: 15/274,224

(22) Filed: Sep. 23, 2016

(65) Prior Publication Data

US 2017/0012253 A1 Jan. 12, 2017

Related U.S. Application Data

(63) Continuation of application No. 13/495,246, filed on Jun. 13, 2012, now Pat. No. 9,496,531.

(30) Foreign Application Priority Data

Jun. 14, 2011 (JP) ................................ 2011-132162
Jun. 14, 2011 (JP) ................................ 2011-132168
(Continued)

(51) Int. Cl.
*H01M 2/10* (2006.01)
*H01M 10/42* (2006.01)

(52) U.S. Cl.
CPC ........ *H01M 2/1022* (2013.01); *H01M 2/1016* (2013.01); *H01M 10/425* (2013.01); *H01M 2010/4271* (2013.01); *H01M 2220/30* (2013.01)

(58) Field of Classification Search
None
See application file for complete search history.

(56) References Cited

U.S. PATENT DOCUMENTS

2002/0006750 A1  1/2002  Hidesawa
2010/0129701 A1  5/2010  Murayama et al.
(Continued)

FOREIGN PATENT DOCUMENTS

CN    102083595    6/2011
CN    102812612    12/2012
(Continued)

OTHER PUBLICATIONS

Office Action, along with English-language translation thereof, in JP Appl. No. 2011-132168 dated Jun. 3, 2014.
(Continued)

*Primary Examiner* — Sarah A. Slifka
(74) *Attorney, Agent, or Firm* — Greenblum & Bernstein, P.L.C.

(57) ABSTRACT

A battery carrier configured to be mounted to a tool body of an electric tool for supplying electric power to the tool body is provided. The battery carrier may include a plurality of battery mount sections disposed at a first surface of the battery carrier and each configured to hold a battery, a tool body mount section disposed at a second surface of the battery carrier opposite to the first surface and configured to be mounted to the tool body, and a marker disposed at the first surface and serving as a target for movement of the tool body mount section relative to the tool body when the tool body mount section is mounted to the tool body.

14 Claims, 10 Drawing Sheets

(30) Foreign Application Priority Data

Jun. 14, 2011 (JP) .................................. 2011-132170
Jun. 14, 2011 (JP) .................................. 2011-132171

(56) References Cited

U.S. PATENT DOCUMENTS

| | | |
|---|---|---|
| 2011/0147031 A1 | 6/2011 | Matthias et al. |
| 2011/0197389 A1 | 8/2011 | Ota et al. |
| 2013/0164589 A1 | 6/2013 | Ota et al. |

FOREIGN PATENT DOCUMENTS

| | | |
|---|---|---|
| DE | 10 2008 040 061 | 1/2010 |
| EP | 1 162 532 | 12/2001 |
| EP | 2 534 745 | 12/2012 |
| JP | 2008-835 | 1/2008 |
| WO | 2011/099349 | 8/2011 |

OTHER PUBLICATIONS

Official Action, along with English-language translation thereof, in CN Appl. No. 20120200485.X dated Mar. 11, 2014.
Extended European Search Report in EP Appl. No. 12004467.2 dated Jun. 4, 2013.
Neuton Battery-Powered Mower Safety and Operating Instructions May 2010.
Neuton Battery-Powered Mower Model: CE6.3, Images (3).
Bosch Brochure—"Bosch Reinvents gardening. You reinvent your garden." (Cordless Range).
Bosch Rotak 43LI Cordless Rotary Lawn Mower Images (5).

BATTERY DEVICES

CROSS REFERENCE TO RELATED APPLICATION

This application is a continuation of pending U.S. patent application Ser. No. 13/495,246 filed Jun. 13, 2012, and which claims priority to Japanese Application No. 2011-132170, filed Jun. 14, 2011, Japanese Application No. 2011-132162, filed Jun. 14, 2011, Japanese Application No. 2011-132168, filed Jun. 14, 2011, and Japanese Application No. 2011-132171, filed Jun. 14, 2011, the disclosures of which are expressly incorporated herein by reference in their entireties.

This application claims priority to Japanese patent application serial numbers 2011-132162, 2011-132168, 2011-132170 and 2011-132171, the contents of which are incorporated herein by reference.

BACKGROUND OF THE INVENTION

Field of the Invention

Embodiments of the present invention relate to battery devices. They are typically adapted to be mounted to the body of an electric tool. They may have a plurality of battery packs (also known as batteries) that serve as a power source in an electric tool.

Description of the Related Art

In recent years, there have been cordless electric tools that include a tool body to which a rechargeable battery pack (also known as a rechargeable battery) is mounted for serving as a power source. Rechargeable battery packs used for this purpose have been standardized so as to be commonly used as power sources for different kinds of electric tools. Therefore, many users retain a plurality of standardized rechargeable battery packs. Generally used standardized rechargeable battery packs have a rating voltage of 18 V for providing a power supply voltage of 18 V.

On the other hand, there are some electric tools, such as lawn mowers and chain saws, operating with a supply of 36 V. For these electric tools, the typical 18 V battery packs cannot be used. Therefore, in order to enable the 18 V battery packs to be used for these electric tools, DE102008040061A1 (also published as US2011/0147031A1) has proposed a battery device for converting a power supply with a voltage of 18 V into a power supply voltage with 36 V. The battery device of this publication is configured to enable two battery packs to be used as a power source. With this battery device, the 18 V battery packs can be used in place of a 36 V battery pack, so that it is possible to handle the two 18 V battery packs as if they are a 36 V battery pack. Therefore, the use of standardized battery packs can be employed in products that they were not originally created for.

However, the battery device disclosed in the above publication still has a problem whereby the increased size of the battery device caused by overlapping battery packs leads to difficulty in handling the electric tool.

Therefore, there has been a need in the art for a battery device that is improved in its handling property.

SUMMARY OF THE INVENTION

In one aspect according to the present teachings, a battery device can be mounted to a tool body of an electric tool for supplying electric power to the tool body. The battery device may include a plurality of battery mount sections each capable of mounting a battery pack. The plurality of battery mount sections may be arranged in a juxtaposed relationship with each other on one side of the battery device.

DETAILED DESCRIPTION OF THE INVENTION

Figure 1:
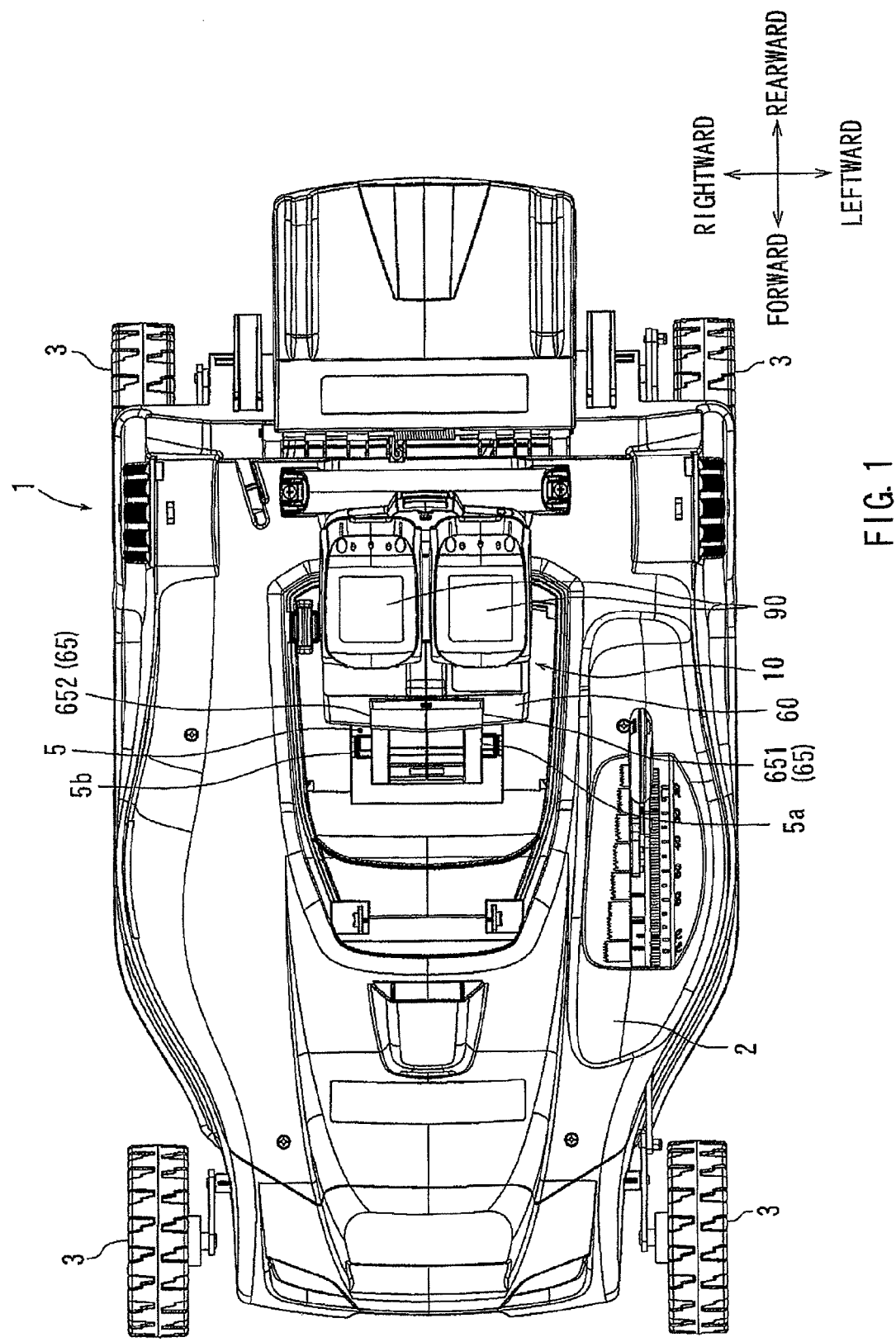
FIG. 1 is a plan view of an electric lawn mower having a battery device mounted thereto.

Each of the additional features and teachings disclosed above and below may be utilized separately or in conjunction with other features and teachings to provide improved battery devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a battery device can be mounted to a tool body of an electric tool for supplying electric power to the tool body. The battery device may include a plurality of battery mount sections arranged in a juxtaposed relationship with each other and each capable of holding a battery pack that has a length along a longitudinal direction. The battery mount sections may be arranged and configured so that the longitudinal directions of the battery packs mounted to the battery mount sections extend substantially parallel to each other with the battery packs aligned with each other on their longitudinal axes.

Therefore, the length of a group of the battery packs can be minimized, and it is also possible to minimize the thickness of a group of the battery packs. As a result, it is possible to reduce the length and the thickness of the entire battery device with the mounted battery packs.

In addition, when a battery device has a control circuit board, the control circuit board may be positioned to extend in a direction intersecting the longitudinal directions of the battery packs, so that it is possible to minimize the size of the battery device in a direction along the longitudinal directions of the battery packs.

The battery mount sections may be configured such that the battery pack is mounted by sliding the battery pack into the battery mount section in a longitudinal direction.

The battery packs may be provided with slide mechanisms or guide rails along their longitudinal lengths for aiding their smooth attachment to the battery mount sections.

Each of the battery mounting devices may have a thickness that is smaller than a thickness of each of the battery packs mounted to the battery mount sections.

With this arrangement, it is possible to reduce the vertical height of the battery device. Therefore, the size of the battery device can be minimized.

When the battery packs are mounted to the battery mount sections, a space may exist near the battery mount sections for enabling a user to grasp the battery packs when removing the battery packs from the battery mount sections.

With this arrangement, the user can insert his or her fingers into the space for grasping the battery packs. Therefore, mounting to and removing the battery packs from the battery device can be easily performed.

The space may be set to have a distance of about 10 to 20 mm. With this distance, the user can easily enter his or her fingers into the space without having to substantially increase the size of the battery device. The distance of about 10 to 20 mm is determined based on an intermediate value of 15 mm. 15 mm is slightly larger than the average thickness of an adult user.

A part of an outer surface of the enclosure portion and a part of an outer surface of one of the battery packs mounted to the battery mount sections may be substantially positioned within the same plane.

With this arrangement, the battery device may be placed on a surface with a part of the outer surface of the enclosure portion and a part of the outer surface of the battery pack(s) both contacting the surface.

In another example, a battery device can be mounted to a tool body of an electric tool for supplying electric power to the tool body. The battery device may include a plurality of battery mount sections arranged in a juxtaposed relationship along an arrangement plane, each capable of holding a battery pack. The battery device may also include an enclosure portion extending on a battery mounting side of the battery device along a direction intersecting with the arrangement plane of the battery mount sections.

With this arrangement, the space occupied by the enclosure portion can be appropriately based depending on the configuration and the size of the battery packs. Therefore, the configuration and the size of the battery device can be minimized to correspond to the size and the configuration of the battery packs.

The battery mount sections and the enclosure portion may be arranged in an L-shape as viewed from a lateral side of the enclosure portion. A control circuit board may be positioned within the enclosure portion.

With this arrangement, the battery device may have a configuration whereby it surrounds the battery packs from two different sides (i.e., two different directions). Further, because the control circuit board may be disposed within the enclosure portion, the battery mount sections can be configured to function exclusively for holding the battery packs. Therefore, the size of the battery device with the battery packs mounted thereto can be minimized. It is also possible to reduce the volume of the battery mount sections, and thus the battery device.

In another example, a battery device capable of being mounted to a tool body of an electric tool may include a mount section having a slide mechanism. The battery device can use this slide mechanism when being attached to the tool body. The mount section may include an engaging mechanism for engaging the tool body when the battery device is in the mount position. The engaging mechanism may include an operation portion used for releasing engagement of the tool body. The operation portion may include a pushing force receiving surface that can be pushed for operating the operation member. The pushing force receiving surface may extend substantially in the mounting direction.

With this arrangement, the engaging mechanism can hold the battery device at the mount position with respect to the tool body after the battery device has been moved to the mount position. In addition, because the pushing force receiving surface may extend substantially in the mounting direction, the size of the battery device in the direction perpendicular to the mounting direction can be minimized even when it includes the operation portion of the engaging mechanism. Therefore, the size of the battery device can be minimized even with the engaging mechanism for holding the battery device at the mount position.

The engaging mechanism may include a male hook portion and a female hook portion provided on the tool body. The male hook portion may engage the female hook portion when the battery device is positioned at the mount position. The male hook portion may protrude in a protruding direction. The pushing force receiving surface preferably extends substantially perpendicular to the protruding direction of the male hook portion.

For example, pushing the pushing force receiving surface may move the male hook portion in a direction opposite the protruding direction, so that the male hook portion may be disengaged from the female hook portion of the tool body. Because the pushing force receiving surface extends substantially perpendicular to the protruding direction of the male hook portion, the pushing force may be applied in the same direction as the moving direction of the male hook portion. Therefore, the operation for releasing engagement of the male hook portion can be easily and efficiently performed.

The pushing force receiving surface may have a length in the mounting direction of the battery device and may have a width in a direction perpendicular to the mounting direction. The length may be set to be longer than the width. This may facilitate the pushing operation of the pushing force receiving surface for releasing engagement of the male hook portion.

In another example, a battery device capable of being mounted to a tool body of an electric tool may include a first mount section and a second mount section. The first mount section is configured to hold a plurality of battery packs. The second mount section may be configured to be mounted to the tool body and disposed on a first side of the battery device. A marker may be disposed on a second side opposite the first side and may serve as a target for movement of the second mount section relative to the tool body when the second mount section is mounted to the tool body.

With this arrangement, the user can smoothly perform the operation for mounting the second mount section to the tool body as he or she views the marker. Therefore, the operation for mounting the battery device to the tool body can be easily performed without having to look at a region between the battery device and the tool body.

The mount section may include a slide mechanism, so that the mount section can be slid relative to the tool body in a mounting direction. The marker may include a marker line. The battery device can be mounted to the tool body by moving the battery device toward the marker line in a direction of the marker line.

The marker line may include a first line and a second line spaced from each other by a distance corresponding to a width of one battery pack. In such a case, the tool body may also have markers spaced from each other by a distance corresponding to a width of one battery pack. Therefore, the markers of the tool body may be used when mounting the battery device to the tool body and may be also used when a single battery pack is directly mounted to the tool body.

Embodiments will now be described with reference to FIGS. 1 to 7. FIG. 1 shows a lawn mower 1 incorporating a battery device 10. The lawn mower 1 is an example of an electric tool and may be used as a gardening tool for mowing lawn grasses. The lawn mower 1 is configured as a cordless tool and is driven with a supply of an electric power from rechargeable battery packs as will be explained later. Thus, the battery device 10 may be mounted to a mower body 2 (i.e., a tool body), so that the mower body 2 can be operated with a supply of an electric power from the battery device 10. More specifically, an electric motor (not shown) may be mounted within the mower body 2, so that the electric motor can rotate with the supply of an electric power to rotatably drive a cutting blade (not shown) for mowing lawn grasses. The cutting blade may be also mounted within the mower body 2. The lawn mower 1 preferably has four wheels 3 that they are mounted to the mower body 2 and preferably include a pair of front wheels 3 and a pair of rear wheels 3. The wheels 3 in each pair may be positioned on opposite sides in the left and right directions. As noted above, the battery device 10 serves as a power source for supplying an electric power to the mower body 2. In this example, the lawn mower 1 is configured to operate with a supply of an electric power of 36 V during the use.

Figure 2:
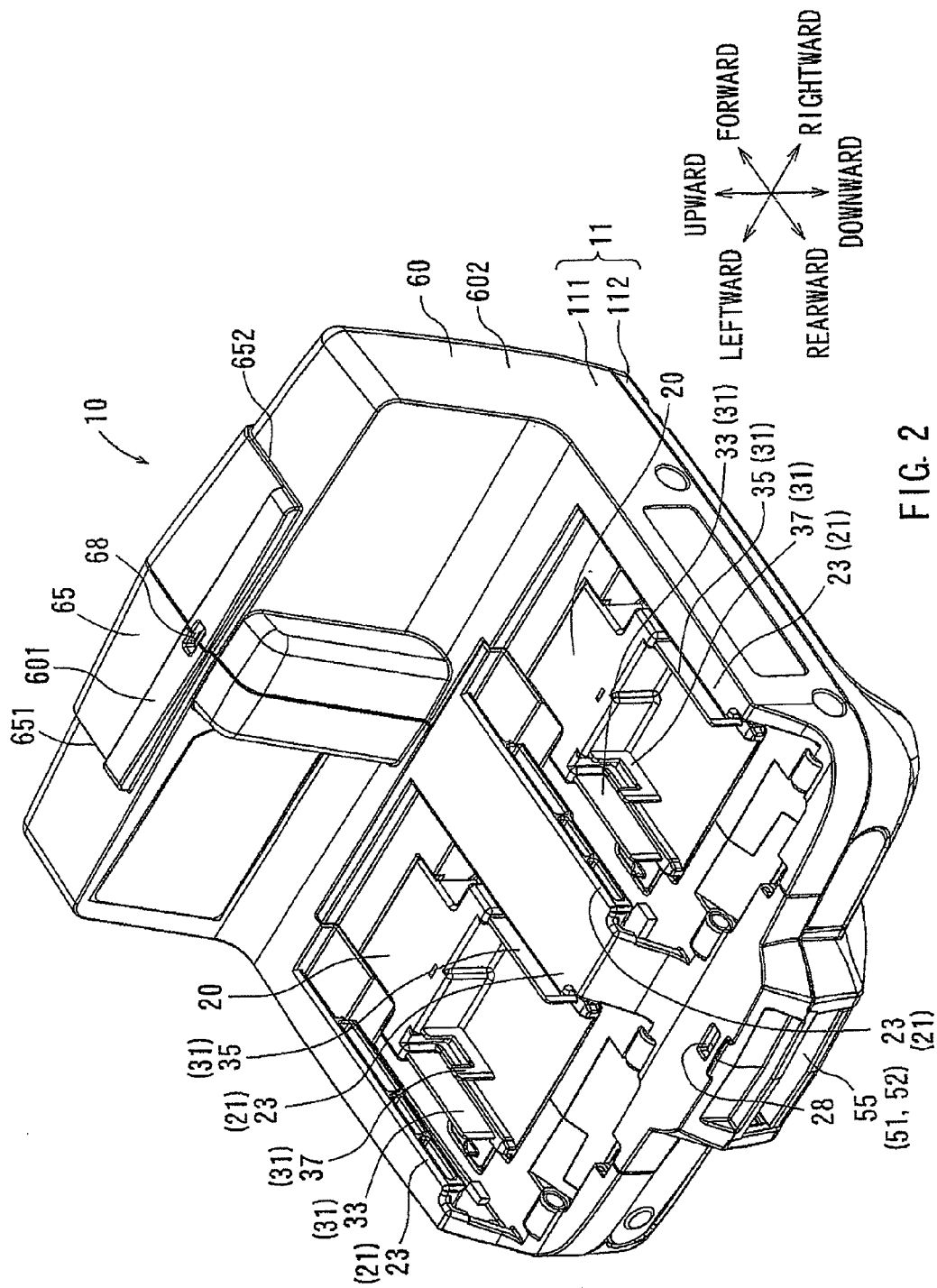
FIG. 2 is a perspective view of the battery device showing the state where battery packs have been removed from the battery device.

Embodiments of the battery device 10 will now be described. FIG. 2 shows a perspective view of the battery device 10 in the state where battery packs 90 have been removed from the battery device 10. FIGS. 3, 4, 5, 6 and 7 show a side view, a plan view, a rear view, a bottom view and a sectional view taken along line VII-VII in FIG. 6, respectively, of the battery device 10 having the battery packs 90 mounted thereto. For the purpose of explanation, the following description will be made with a determination that (a) the side in a mounting direction of the battery pack 90, along which the battery pack 90 is slid for mounting to the mower body 2 (tool body), is a front side and (b) the side of the battery packs 90 (mounted state) with respect to the battery device 10 is an upper side.

Figure 4:
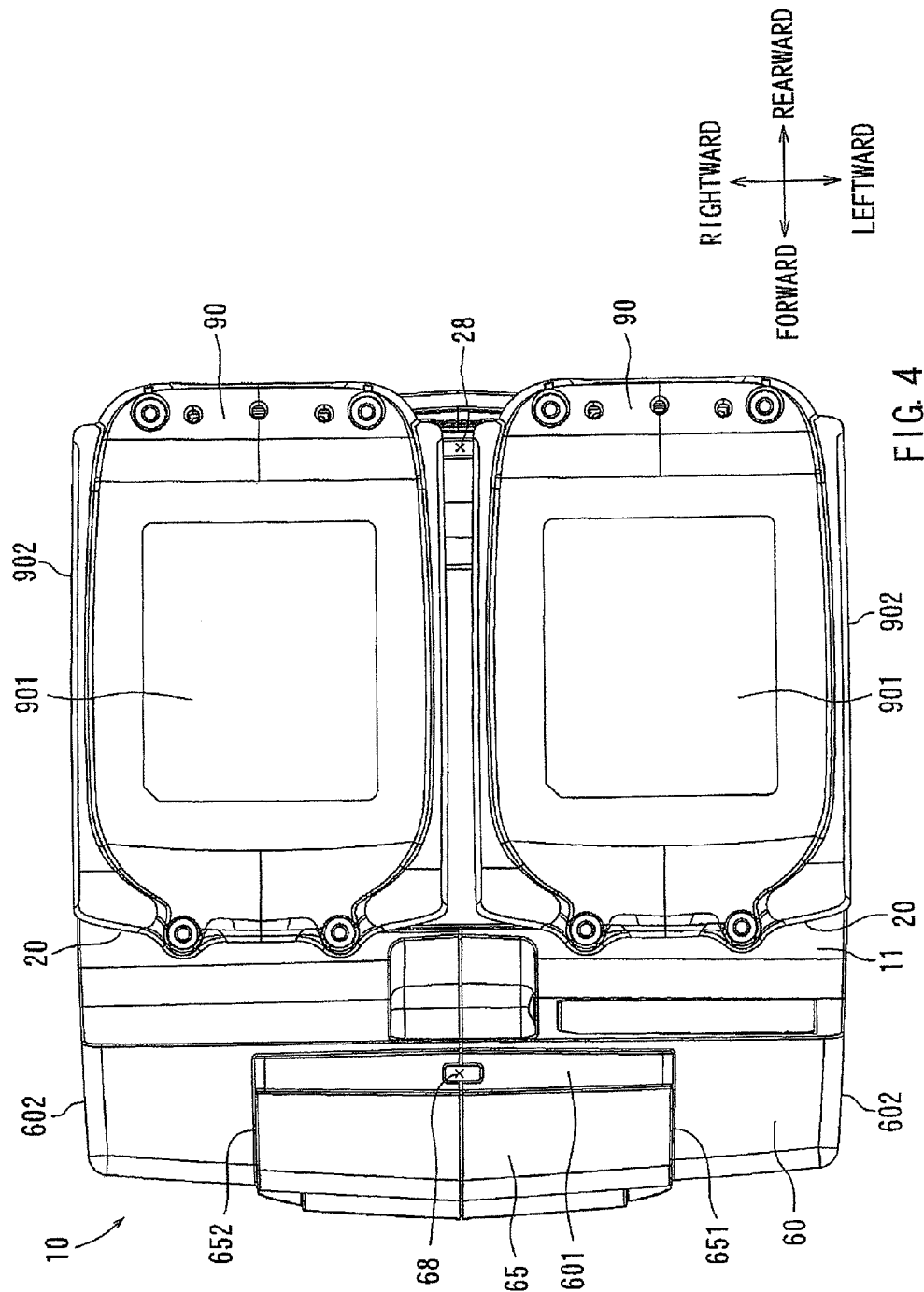
FIG. 4 is a plan view of the battery device having the battery packs mounted thereto.
Figure 5:
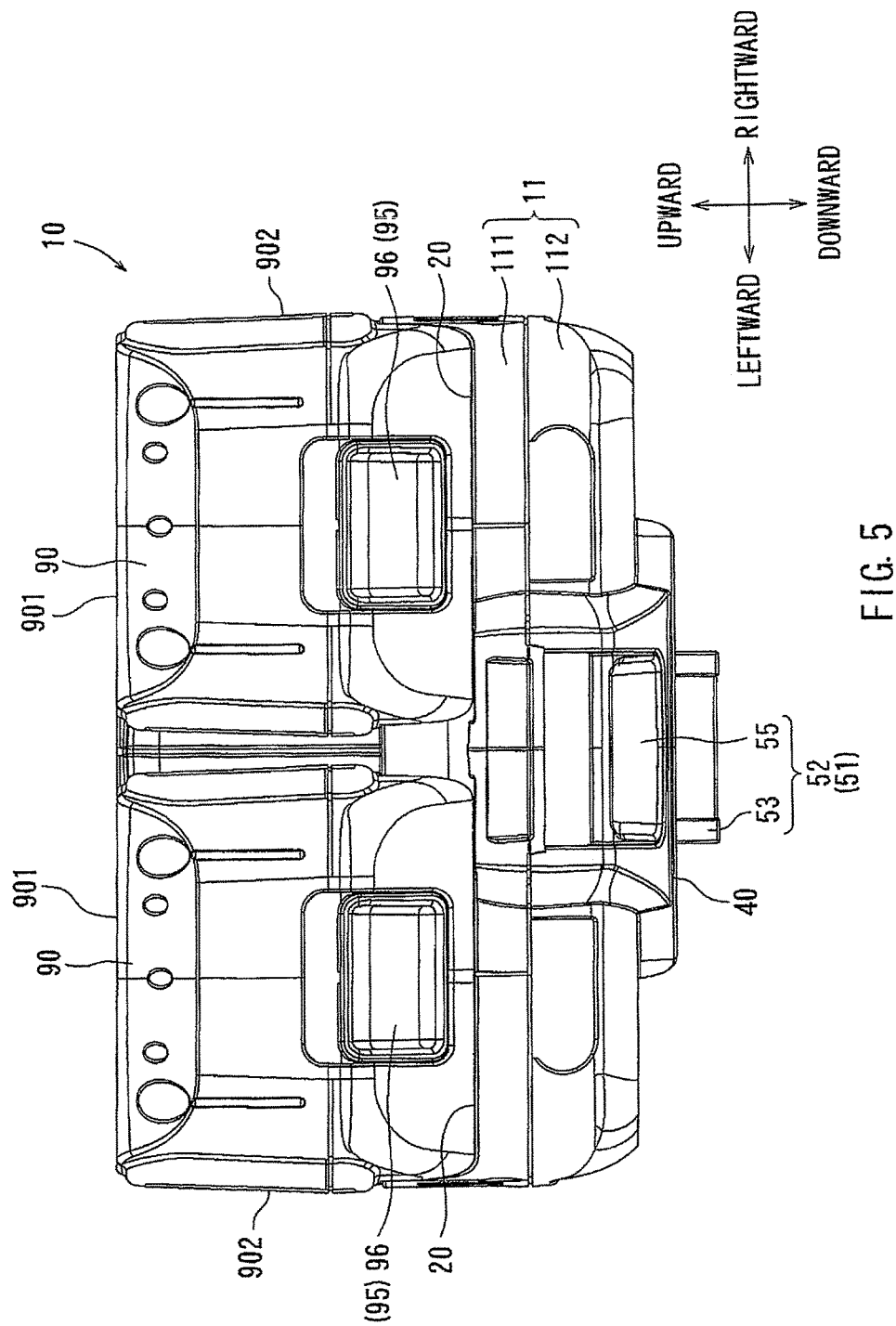
FIG. 5 is a rear view of the battery device having the battery packs mounted thereto.
Figure 6:
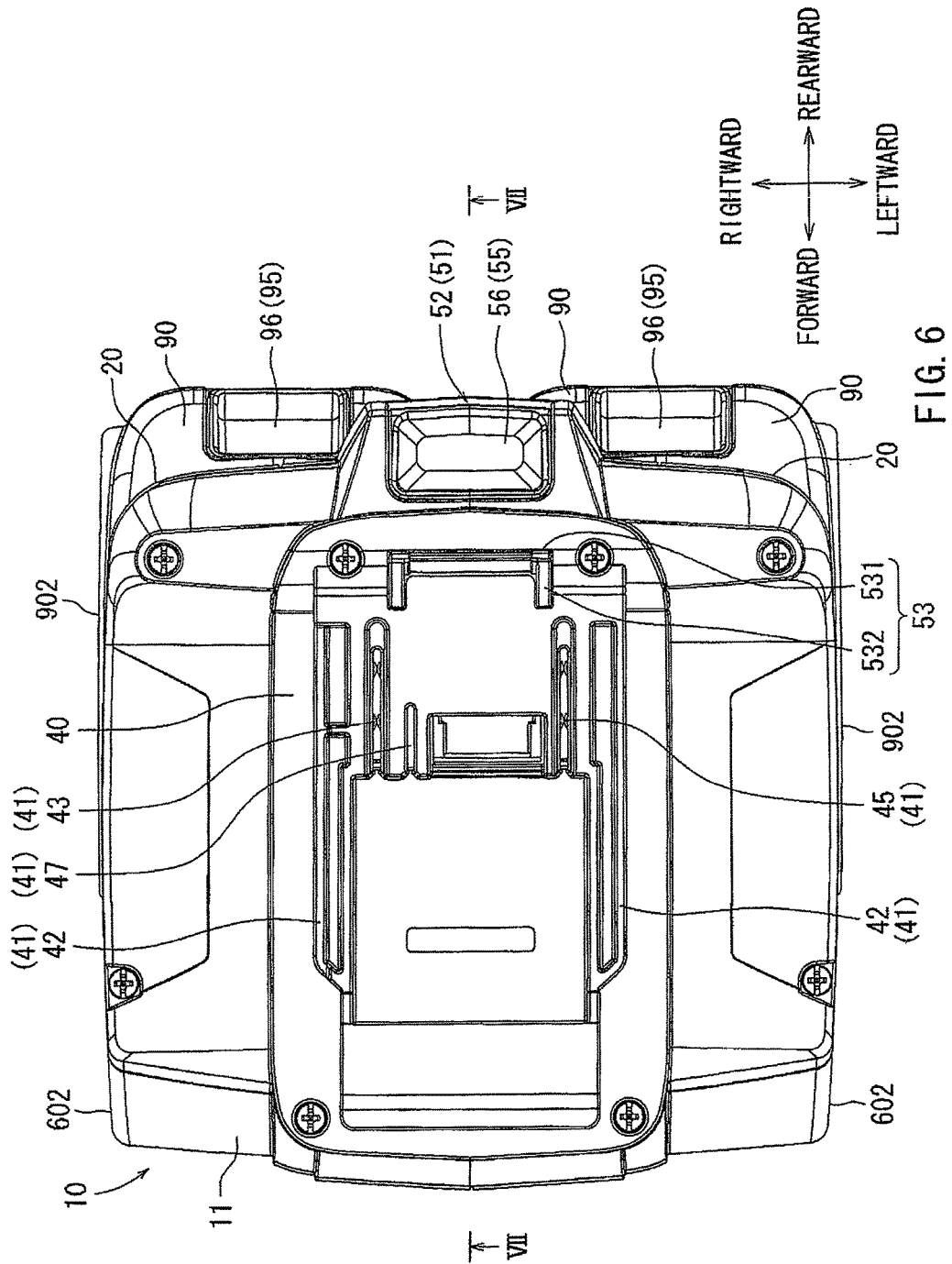
FIG. 6 is a bottom view of the battery device having the battery packs mounted thereto.

As shown in FIG. 4, the battery device 10 may be configured to be able to hold two battery packs 90 each having a rating voltage of 18 V and serving as a power source for the mower body 2. The two battery packs 90 may be electrically connected in series to supply a power source voltage of 36 V to the mower body 2. To this end, the battery device 10 may include two battery mount sections 20 each configured to be able to hold one battery pack 90. The battery mount sections 20 are preferably disposed on the upper surface side of the battery device 10 and are arranged in a juxtaposed relationship. In addition, as shown in FIG. 6, the battery device 10 preferably has a single mount section 40 disposed on the lower surface side of the battery device 10 for mounting to a corresponding mount section 5 of the mower body 2. The battery device 10 preferably has a case 11 having an enclosure portion 60, in which a main control circuit board 62 is disposed (see FIG. 7). Therefore, the battery device 10 is generally composed of the case 11 having the enclosure portion 60 and the battery mount sections 20 and the mount section 40 disposed on the case 11.

Figure 3:
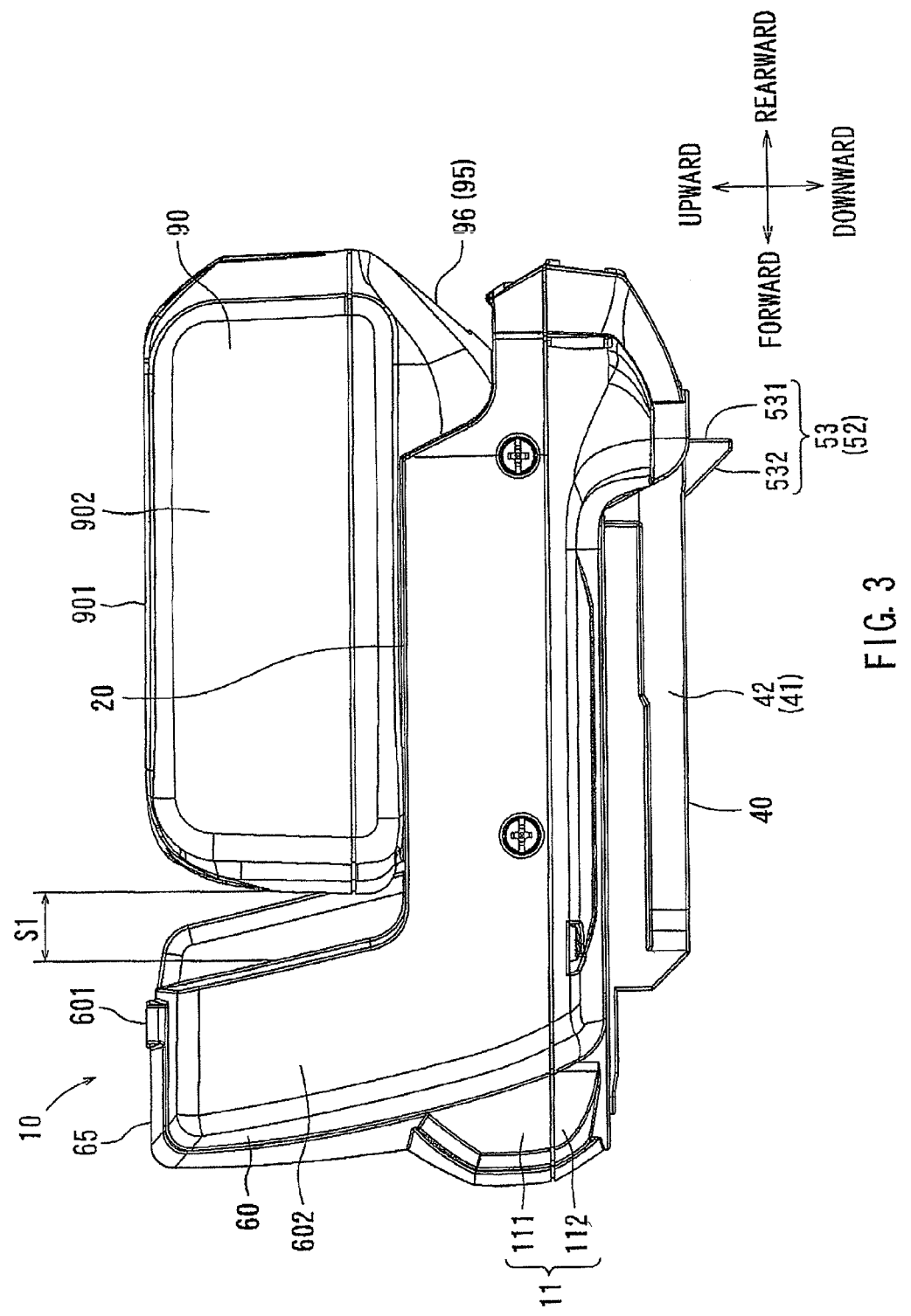
FIG. 3 is a side view of the battery device having the battery packs mounted thereto.

The case 11 may be formed by a molding process using plastic or synthetic resin and may include a case body 111 and a lid 112 that are joined to each other. As shown in FIGS. 2 and 3, the case 11 preferably has a substantially L-shape as viewed from the lateral side and define a hollow internal space that extends in the lateral directions (the right and left directions). Various electric wires and various control circuit boards including the main control circuit board 62 may be disposed within the hollow internal space.

As shown in FIGS. 2 and 3, the battery mount sections 20 may be provided on the case 11 to extend from the rear end of the case 11 to a middle position of the case 11 with respect to the forward and rearward directions and may be disposed to be juxtaposed in the left and right directions. The enclosure portion 60 may be formed at the front end of the case 11 and extend in the left and right directions. More specifically, a portion of the case 11 where the battery mount sections 20 are provided is configured to have a hollow structure having a relatively small height and extending both in the forward and rearward directions and the left and right directions. The battery packs 90 may be positioned on the upper side of the battery mount sections 20 when they are moved to mount positions with respect to the respective battery mount sections 20. The enclosure portion 60 is preferably a hollow structure portion formed at the rear end of the case 11. It preferably has a height larger than that of the portion having the battery mount sections 20, so that the enclosure portion 60 extends upward beyond the portion having the battery mount sections 20. Therefore, the enclosure portion 60 extends upward past the battery mount sections 20 in a direction that intersects with a direction of a plane along which the battery mount sections 20 are juxtaposed with each other. As will be described later, the mount section 40 may be disposed on the case 11 on the side opposite where the battery mount sections 20 are disposed.

The battery packs 90 are preferably mounted to the battery mount sections 20 at positions on the upper side thereof. When the battery packs 90 are mounted to the mount position with respect to the battery mount sections 20, an upper end surface 601 of the enclosure portion 60 may be positioned at substantially the same level as upper surfaces 901 of the battery packs 90. Thus, the height of the enclosure portion 60 may be determined according to the height of the battery packs 90 that are mounted to the battery mount sections 20. In this way, the enclosure portion 60 may be configured to extend upward from the remaining portion of the case 11 and to extend along substantially the entire width of the battery device 10 in the left and right directions. Therefore, as shown in FIG. 3, the positional relationship between the battery mount sections 20 and the enclosure portion 60 can be determined such that they form a substantially L-shape as viewed from a side view, i.e. in the left and right extending direction of the enclosure portion 60. In other words, the battery device 10 may be configured to have the battery mount sections 20 and an enclosure portion 60 that are integrated with each other to form an L-shape (i.e., a structure having two components extending in different directions). Further, the thickness of the battery mount sections 20 in the vertical direction is preferably set to be smaller than the thickness of the battery packs 90 mounted to the battery mount sections 20.

Figure 7:
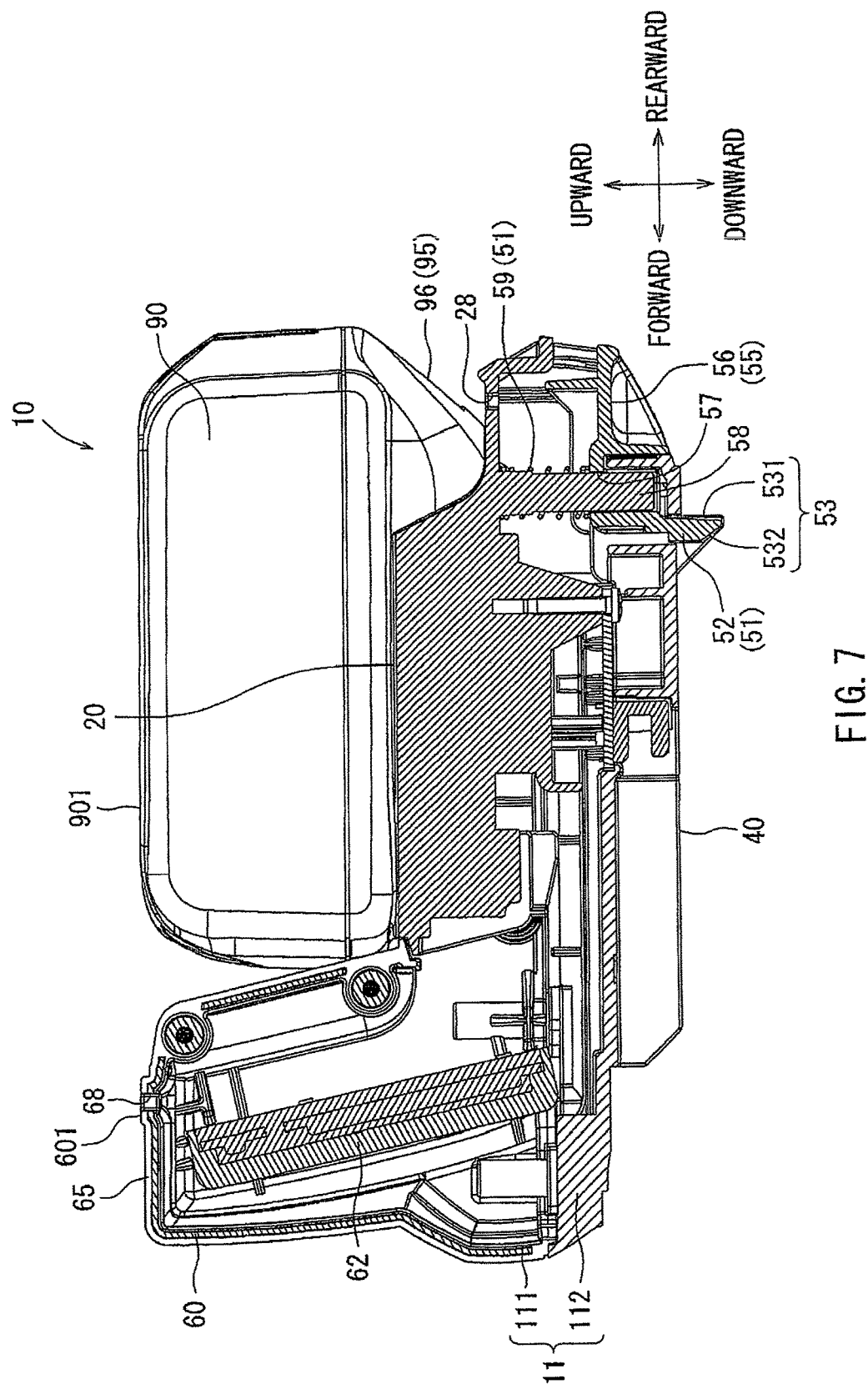
FIG. 7 is a sectional view taken along line VII-VII in FIG. 6.

Referring to FIG. 7, the main control circuit board 62 disposed within the enclosure portion 60 may be electrically connected to the battery packs 90 that are mounted to the battery mount sections 20. The main control circuit board 62 may serve to receive the supply of the electric power from the battery packs 90 and to output the electric power to the mower body 2 after transforming the supplied voltage.

The battery mount sections 20 will now be described. As described previously, the battery mount sections 20 are preferably disposed at the case 11 in a juxtaposed relationship with each other. More specifically, the battery mount sections 20 are preferably configured to be able to hold the corresponding battery packs 90 as the battery packs 90 are slid onto the battery mount sections 20. The longitudinal axes of the battery packs 90 and the battery mount sections 20 oriented such that their sliding directions are parallel to each other. In other words, the battery mount sections 20 are arranged in parallel to each other and also parallel to the sliding directions or the mounting directions of the battery packs 90 (i.e., the longitudinal axes of the battery packs 90 in the mounted state). In addition, in this example, the lengths of the battery packs 90 along their longitudinal directions are the same with each other. Therefore, in the mounted state, the longitudinal axes of the battery packs 90 extend parallel to each other, and opposite ends in the longitudinal direction of each of the battery packs 90 are positioned to be aligned with opposite ends in the longitudinal direction of the other battery pack 90. In certain embodiments, the ends of parallel-aligned battery mount sections 20 as well as battery packs 90 may not lie in the same lateral locations. In other embodiments, their starting and/or stopping points may exist in the same relative lateral locations.

Because the battery mount sections 20 may be the same in construction, the construction of only one of the battery mount sections 20 will be described. The battery mount section 20 may be configured such that the battery pack 90 can be slidably mounted to the battery mount section 20 and can be electrically connected to the battery mount section 20. More specifically, the battery mount section 20 may have a slide mechanism 21 and an electrical connector mechanism 31. The slide mechanism 21 is preferably configured to be able to slidably engage the battery pack 90 and preferably includes a pair of guide rails 23 for slidably engaging a corresponding pair of male guide portions provided on the battery pack 90. The guide rails 23 are preferably disposed on the left side and the right side of the battery mount section 20, respectively, and extend in the forward and rearward directions. The guide rails 23 are preferably configured to have female guide portions corresponding to the male guide portions of the battery pack 90. Therefore, the battery pack 90 can be slid in a direction from the rear side toward the front side under the guide of the guide rails 23 until reaching the mount position.

In this way, the slide mechanism 21 serves to guide the battery pack 90 for sliding movement from the rear side toward the front side to enable the battery pack 90 to be mounted to the battery mount section 20. The electrical connector mechanism 31 serves to electrically connect the battery pack 90 to the battery mount section 20 when the battery pack 90 has reached the mount position. More specifically, the electrical connector mechanism 31 includes a positive terminal 33, a negative terminal 35 and a control terminal 37. The positive terminal 33 may have a male connecting portion for connecting with a corresponding female connecting portion of a positive terminal (not shown) of the battery pack 90. Similarly, the negative terminal 35 may have a male connecting portion for connecting with a corresponding female connecting portion of a negative terminal (not shown) of the battery pack 90. The control terminal 37 may have a male connecting portion for connecting with a corresponding female connecting portion of a control terminal (not shown) of the battery pack 90. In this way, when the battery pack 90 has reached the mount position, the positive terminal 33, the negative terminal 35 and the control terminal 37 of the electric connector mechanism 31 are electrically connected to the positive terminal, the negative terminal and the control terminal of the battery pack 90, respectively.

As shown in FIG. 2, the battery mount section 20 may be configured to provide a finger insertion space with a spacing distance S1 between the front end of the battery pack 90 and the rear surface of the enclosure portion 60 when the battery pack 90 has been mounted to the battery mount section 20. The finger insertion space S1 allows the user to insert his or her fingers when the user intends to remove the battery pack 90 from the battery mount section 20. For example, the spacing distance S1 may be set to be 10 mm to 20 mm. Preferably, taking into account of the thickness of fingers of an average user, the spacing distance S1 may be set to be about 15 mm measured at an intermediate position with respect to the vertical direction of the finger insertion space. The finger insertion space positioned on the front side of the battery pack 90 enables the user to push the battery pack 90 in the removing direction, so that the removal of the battery pack 90 can be easily performed. In addition, the finger insertion space is positioned on the side opposite to an operation portion 95 of the battery pack 90, which is used for releasing the engagement of the battery pack 90 and the battery mount section 20. Therefore, this arrangement is advantageous in that the user can easily perform the operation for releasing engagement of the battery pack 90.

The mount section 40 will now be described. The mount section 40 is configured such that the battery device 10 can be slidably mounted to the mount section 5 of the mower body 2 (see FIG. 1) and can be electrically connected to the mount section 5. The mount section 40 is preferably disposed on the backside of the battery device 10 and includes a mount structure 41 and an engaging structure 51. The mount structure 41 preferably includes a slide mechanism and an electrical connector mechanism. The engaging structure 51 is preferably configured to be able to engage the mount structure 41 with the mount section 5 and to disengage the mount structure 41 from the mount section 5. The slide mechanism of the mount structure 41 preferably includes a pair of male guide portions 42 for slidably engaging a pair of guide rails (not shown) provided on the mount section 5. The male guide portions 42 are preferably disposed on the left side and the right side of the mount section 40 and extend in the forward and rearward directions. The electrical connector mechanism of the mount structure 41 may serve to electrically connect the mount section 40 to the mount section 5 when the battery device 10 has reached the mount position. More specifically, the electrical connector mechanism preferably includes a positive terminal 43, a negative terminal 45 and a control terminal 47. The positive terminal 43 may have a female connecting portion for connecting with a corresponding male connecting portion of a positive terminal (not shown) of the mount section 5. Similarly, the negative terminal 45 may have a female connecting portion for connecting with a corresponding male connecting portion of a negative terminal (not shown) of the mount section 5, and the control terminal 47 may have a female connecting portion for connecting with a corresponding male connecting portion of a control terminal (not shown) of the mount section 5.

The engaging structure 51 of the mount structure 41 is preferably configured as a male hook mechanism that is capable of being engaged with and disengaged from the mount section 5. More specifically, as shown in FIG. 7, the engaging structure 51 preferably includes a male hook member 52 and a spring 59 for biasing the male hook member 52.

The male hook member 52 preferably is adjustably (preferably in the vertical direction) supported by the case 11 and is normally biased by the spring 59 in the downward direction toward the outside of the case 11. The male hook member 52 preferably includes a male hook portion 53 and an operation portion 55 formed integrally with each other. The operation portion 55 may be used for releasing engagement of the male hook portion 55. A guide hole 57 may be formed in the male hook member 52 at a position between the male hook portion 53 and the operation portion 55. The male hook portion 53 may be positioned at the outer end (lower end) of the male hook member 52 and may be engageable with a female hook portion (not shown) of the mount section 5 of the mower body 2. The male hook portion 53 preferably has a stopper surface 531 and an inclined surface 532. The stopper surface 531 is preferably configured to contact a surface of the female hook portion of the mount section 5 during engagement of the male hook portion 53 with the female hook portion. The inclined surface 532 preferably serves to facilitate movement of the male hook portion 53 for engaging with the female hook portion. The operation portion 55 is preferably disposed at the rear portion of the male hook member 52 and extends rearward from the male hook portion 53 in a direction intersecting with the protruding direction (vertical direction in this example) of the male hook portion 53 so as to be exposed to the outside. Thus, the operation portion 55 can be operated by the user for releasing engagement of the male hook portion 53 with the female hook portion of the mount section 5 of the mower body 2. The operation portion 55 is preferably configured to have a concave shape with a central bottom surface that serves as a pushing force receiving surface 56 (see FIGS. 6 and 7). Therefore, the user can push the pushing force receiving surface 56 for operating the operation portion 55.

As described above, pushing the pushing force receiving surface 56 can release the engagement of the male hook portion 53 with the female hook portion of the mount section 5 of the mower body 2. The pushing force receiving surface 56 is preferably configured as a flat surface that extends in a different direction from a pushing force receiving surface 96 of the operation portion 95 of the battery pack 90. Thus, the pushing force receiving surface 56 extends within a plane along the sliding direction or the mounting direction (forward and rearward direction in this example) of the battery device 10 for mounting to the mount section 5 of the mower body 2. In addition, the plane of the pushing force receiving surface 56 is preferably perpendicular to the protruding direction (vertical direction in this example) of the male hook portion 53. In other words, the plane of the pushing force receiving surface 56 is preferably perpendicular to the moving direction of the male hook member 52.

Incidentally, if the battery device 10 is positioned to extend in the horizontal direction, the sliding directions of the battery packs 90 for mounting to the corresponding battery mount sections 20 may also extend in the horizontal direction. In such a case, the plane of the pushing force receiving surface 45 also extends in the horizontal direction, i.e., the direction parallel to the sliding directions of the battery packs 90. In this example, the pushing force receiving surface 56 has a rectangular shape. More specifically, the length of the pushing force receiving surface 56 in the forward and reward directions (i.e., the sliding directions of the battery packs 90 or the sliding direction of the battery device 19) is set to be longer than the width in the left and right direction (i.e., the direction perpendicular to the sliding directions of the battery packs 90 or the sliding direction of the battery device 19). On the other hand, the pushing force receiving surface 96 of the operation portion 95 of the battery pack 90 may be inclined relative to the sliding direction of the battery device 10 for mounting to the mount section 5, and therefore, the pushing force receiving surface 96 may be inclined relative to the horizontal direction when the battery device 10 is positioned to extend in the horizontal direction.

The direction of movement of the operation portion 55 for releasing the engagement of the male hook portion 53 with the female hook portion of the mount section 5 of the mower body 2 may be set to be upward with respect to the battery device 10 or toward inside of the case 11. Thus, if the user pushes the operation portion 55 upward against the biasing force of the biasing spring 59, the male hook portion 53 retracts into the battery device 10, so that the male hook portion 53 can be disengaged from the female hook portion provided on the mount section 5 of the mower body 2. The guide hole 57 serves to guide the protruding and retracting movements of the male hook portion 53, and for this purpose, the guide hole 57 is preferably formed at a position between the male hook portion 53 and the operation portion 55. It preferably slidably receives a cylindrical guide member 58 that is integrated with the case 11 and protrudes from inside of the case 11. The guide hole 57 may be opened in the vertical direction and the cylindrical guide member 58 may also extend in the vertical direction. Therefore, as the operation portion 55 is pushed upward against the biasing force of the spring 59, the male hook portion 53 may retract into the case 11 under the guide of the cylindrical guide member 58. In this example, the spring 59 is a compression coil spring having one end contacting with the case 11 and the other end contacting with a portion of the male hook member 52 around the guide hole 57, so that the male hook member 52 is biased downward toward the outside of the case 11.

As shown in FIGS. 1 and 2, a marker 65 is preferably provided on the upper surface of the enclosure portion 60 of the battery device 10, so that the mount section 40 can be mounted to the mower body 2 by using the marker 65 as a target for movement. Therefore, the battery device 10 can be easily mounted to the battery device 10 by moving the battery device 10 to slide toward the marker 65. To this end, the marker 65 is positioned on the upper side opposite the lower side (backside) where the mount section 40 is positioned. In addition, the marker 65 is preferably provided on the upper surface of the enclosure portion 60 which is positioned at the front end of the battery device 10 with respect to the mounting direction of the battery device 10. As shown in FIGS. 2 and 4, the marker 65 may be raised upward from the upper surface of the enclosure portion by a given distance and is preferably positioned to correspond to markers 5a and 5b that are provided on the upper surface of the mower body 2. More specifically, the marker 65 preferably includes opposite end edges 651 and 652 that are aligned with the markers 5a and 5b, respectively, when the battery device 10 is located at the mount position with respect to the mount section 5 under the guide of the slide mechanism 21. Therefore, the end edges 651 and 652 of the marker 65 may serve as marker lines. The distance between the end edges 651 and 652 is set to correspond to the width of one battery pack 90 or one battery pack having a rating voltage of 36 V. In this way, the end edges 651 and 652 may be aligned with the markers 5a and 5b, respectively, in the mounting direction of the battery device 10. Therefore, in order to mount the battery device 10 to the mount section 5 of the mower body 2, the user may position the battery device 10 such that the end edges 651 and 652 are aligned with the markers 5a and 5b of the mower body 2, respectively. The battery device 10 may then be slid forward under the guide of the slide mechanism 21, so that the battery device 10 can be mounted to the mount section 5. Likely, a user can mount the battery device 10 without having to look at the backside of the battery device 10 for aid in alignment.

The case 11 of the battery device 10 is preferably formed with a first water discharge hole 28 and a second water discharge hole 68 (see FIGS. 4 and 7) for discharging water that may enter inside of the case 11. Therefore, the water discharge performance of the case 11 can be improved. In this example, the positions of the first and second water discharge holes 28 and 68 are preferably chosen such that water can be efficiently discharged when the battery device 10 is turned upside down. Thus, in order to discharge water that has entered inside of the case 11, the user may turn upside down the battery device 10, for example, from the position shown in FIGS. 5 and 7, so that the water may be discharged from the first and second water discharge holes 28 and 68 to the outside of the case 11.

As shown in FIG. 7, the first water discharge hole 28 is preferably formed in the upper wall of the rear portion of the case 11 to communicate with the inside and the outside of the case 11. More specifically, the first water discharge hole 28 is preferably positioned on the upper side of the male hook member 52. Therefore, when the battery device 10 is turned upside down, the first water discharge hole 28 is positioned on the lower side of the male hook member 52. Thus, water that happens to enter the inside of the case 11 from the region where the male hook member 52 is provided, can be discharged from the first discharge hole 28.

Also, as shown in FIG. 7, the second water discharge hole 68 is preferably formed in the upper wall of the enclosure portion 60 disposed at the front portion of the case 11. The second water discharge hole 68 preferably communicates with the inside and the outside of the case 11. The second water discharge hole 68 is preferably positioned on the upper side of the main control circuit board 62. Therefore, when the battery device 10 is turned upside down, the second water discharge hole 68 is positioned at the lowest position of the enclosure portion 60. Thus, water that may enter inside of the case 11 from the region where the main control circuit board 62 is provided, can be discharged from the second discharge hole 68. Therefore, it is possible to prevent water from being stored around the main control circuit board 62.

With the battery device 10 of this example, two battery packs 90 can be mounted to the battery device 10 in a juxtaposed relationship with each other. In this example, the lengths of the battery packs 90 in their longitudinal directions are the same. When the battery packs 90 are mounted to the battery mount sections 20, the longitudinal directions of the battery packs 90 extend substantially parallel to each other. In this fashion, the length of a group of the battery packs 90 can be minimized their thickness as a group can be minimized. As a result, it is possible to reduce the length and the thickness of the entire battery device 10 with the battery packs 90 mounted.

In addition, the main control circuit board 62 may be positioned to extend in a direction intersecting the longitudinal directions of the battery packs 90. This serves to minimize the size of the battery device 10 in a direction along the longitudinal directions of the battery packs 90.

Further, the battery pack 90 may be mounted to each of the battery mount sections 20 as the battery pack 90 is slid in the mounting direction. The mounting direction is preferably substantially parallel to the longitudinal direction of each battery pack 90.

With this arrangement, slide mechanisms 21 for the sliding movement of the battery packs 90 may be provided in regions along the longitudinal directions of the battery packs 90. In this way, it is possible to ensure a sufficient length of the slide mechanisms 21 and the guide rails 23. As a result, mounting the battery packs 90 can be performed quickly and easily.

With the battery device 10 of this example, the enclosure portion 60 may extend on the battery mounting side (where the battery packs 90 are mounted) along a direction intersecting a plane along which the battery mount sections 20 are juxtaposed with each other. Therefore, the space occupied by the enclosure portion 60 can be determined based on the configuration and the size of the battery packs 90. Therefore, the configuration and the size of the battery device 10 can be minized to correspond to the size and the configuration of the battery packs 90. In addition, because the battery mount sections 20 and the enclosure portion 60 are arranged to form an L-shape as viewed from the extending direction of the enclosure portion 60, the battery device 10 can be configured to surround the battery packs 90 from two different sides (i.e., two different directions). Further, because the main control circuit board 62 may be disposed within the enclosure portion 60, the battery mount sections 20 can be configured to function exclusively for holding the battery packs 90. Therefore, the size of the battery device 10 with the battery packs 90 attached thereto can be minimized. It is also possible to reduce the volume of the battery mount sections 20 thus leading to a reduction in the volume of the battery device 10.

In addition, the thickness (i.e, the size in the vertical direction) of the battery mount sections 20 is preferably set to be thinner than the thickness of the battery packs 90 to be mounted to the battery mount section 20. Therefore, it is possible to reduce the vertical length of the battery device 10 when the battery packs 10 are mounted to the battery mount section 20. In this way, the size of the battery device 10 can be minimized. Further, when the battery packs 90 are mounted to the battery device 10, the finger insertion space having a distance S1 may be formed between the battery packs 90 and the enclosure portion 60. Therefore, the user can easily removed the battery packs 90 from the battery mount sections 20 by inserting his or her fingers into the finger insertion space. Hence, the operations for mounting the battery packs 90 from the battery mount sections 20 and for removing the battery packs 90 from the battery mount sections 20 can be easily performed. In addition, when the battery packs 90 are mounted to the battery mount sections 20, the upper end surface 601 of the enclosure portion 60 exposed outside of the enclosure portion 60 may be positioned at substantially the same level as the upper surfaces 901 of the battery packs 90. In other words, the upper surface 601 and the upper surfaces 901 may extend substantially within the same plane. Therefore, by turning the battery device 10 upside down, the battery device 10 can be placed on a surface with the upper end surface 601 of the enclosure portion 60 and the upper surfaces 901 of the battery packs 90 contacting the surface. Hence, the battery device 10 with the battery packs 90 mounted thereto can be placed in a stable position on such surface.

Figure 8:
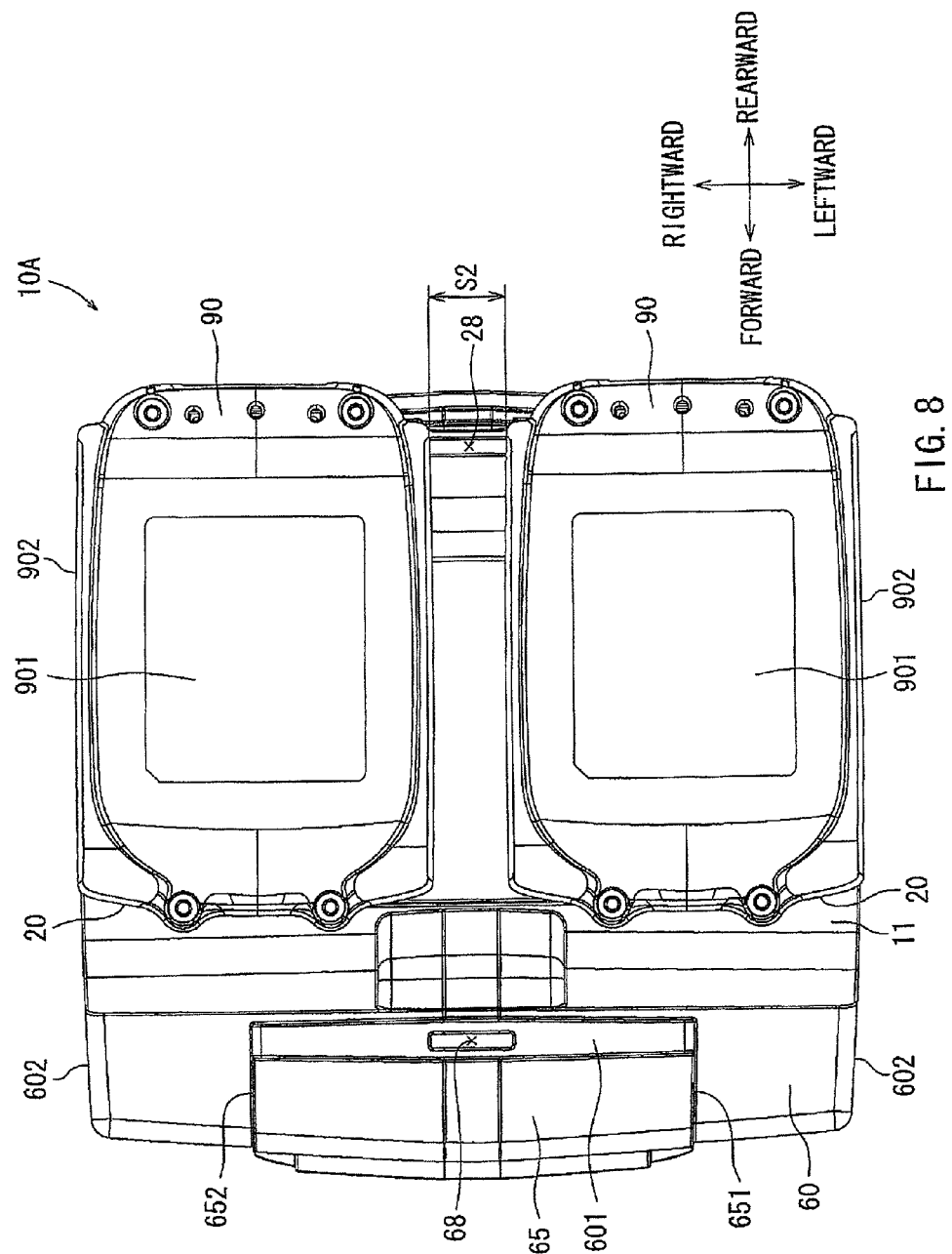
FIG. 8 is a plan view of a battery device.
Figure 9:
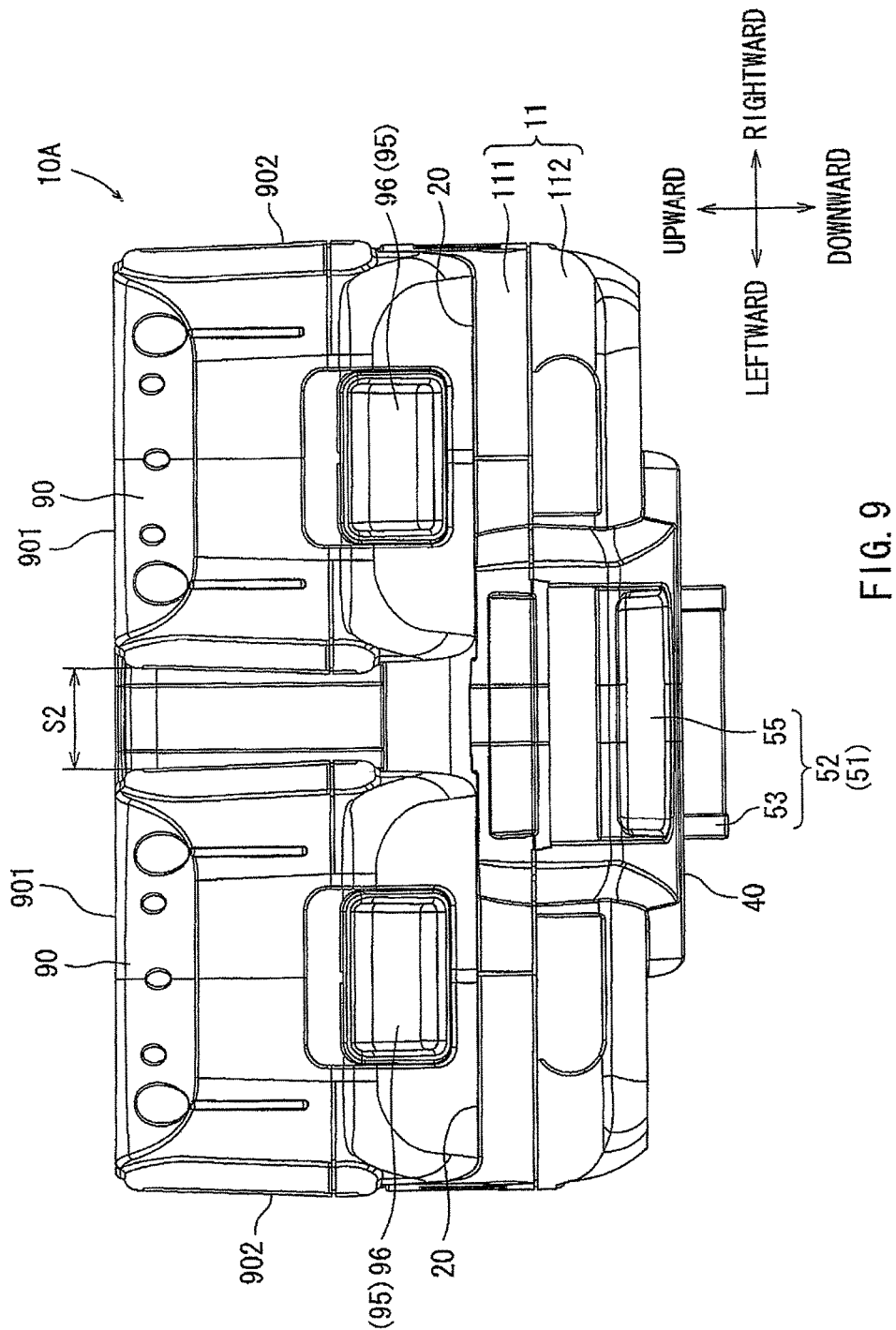
FIG. 9 is a rear view of the battery device shown in FIG. 8.

Embodiments will now be described with reference to FIGS. 8 and 9. A distance between the juxtaposed battery mount sections 20 in the left and right directions (widthwise directions) in this example may be larger that that of previous embodiments. Therefore, the battery device 10A will be described in connection with the distance between the two juxtaposed battery mount sections. In addition, in FIGS. 8 and 9, like members are given the same reference numerals as previous examples and the description of these members will not be repeated.

A finger insertion space having a distance S2 may be foinied between the two battery packs 90 mounted to the battery mount sections 20. Therefore, the user can insert his or her fingers into the finger insertion space, for example, when the user slide-mounts the battery packs 90 to the battery mount sections 20. For example, the distance S2 may be set to be about 10 to 20 mm. Thus, the distance between the battery mount sections 20 may provide a distance S2 between the two battery packs 90. Because the user can apply his or her fingers to the left and right side surfaces of the battery packs 90, the user can easily grasp the battery packs 90. Therefore, the operations for mounting the battery packs 90 to the battery device 10 and for removing the battery packs 90 from the battery device 10 can be easily performed.

An example will now be described with reference to FIG. 10. A battery device 10B according to this example preferably has an enclosure portion 70 is disposed between the juxtaposed two battery mount sections 20 in the left and right directions (widthwise directions). The battery device 10B will be described only in connection with the enclosure portion 70. In addition, in FIG. 10, like members are given the same reference numerals as previous embodiments and the description of these members will not be repeated.

Figure 10:
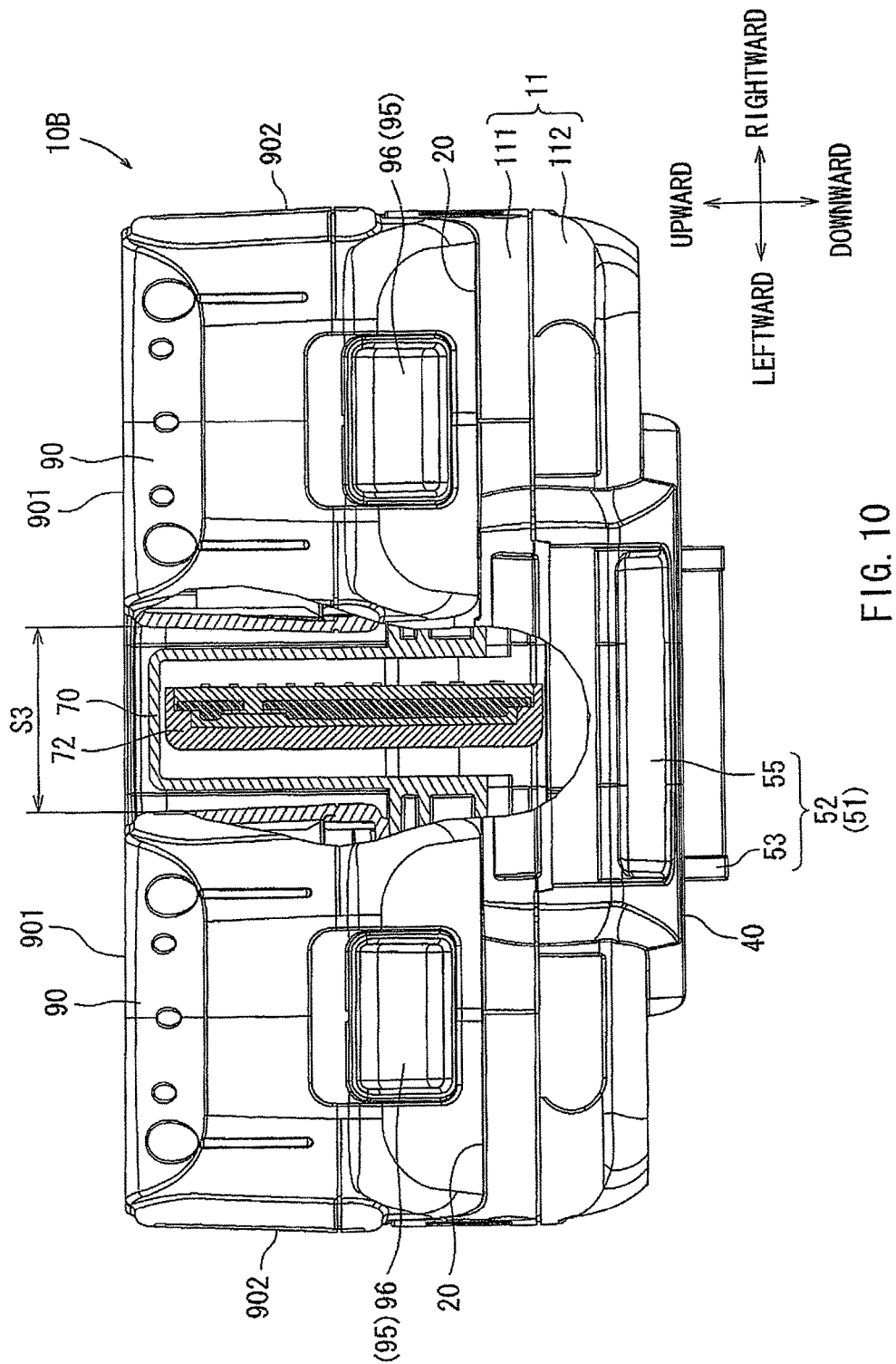
FIG. 10 is a rear view with a part shown in cross section of a battery device.

As shown in FIG. 10, the two battery packs 90 mounted to the battery mount sections 20 are preferably spaced from each other by a distance S3 in the left and right direction (widthwise direction). The enclosure portion 70 is preferably positioned in the space having the distance S between the two battery packs 90. The enclose portion 70 may be formed integrally with the case 11 and define a space that communicates with inside of the battery mount sections 20 disposed at the lower portion of the battery device 10B. It may also communicate with inside of the enclosure portion 60. A control circuit board 72 may be disposed within the enclosure portion 70. Therefore, a space for installing the control circuit board 72 can be provided in the enclosure portion 70. The control circuit board 72 may be a different circuit board from the main control circuit board 62.

The above examples may be modified in various ways. For example, although the battery packs 90 have been mounted to the battery mount sections 20 as they are slid onto the battery mount sections 20, it may be possible to configure such that each battery pack 90 is mounted to the corresponding battery mount section 20 by using any other suitable mounting structure, such as a fitting structure.

The above examples may be further modified in various ways. For example, for the enclosure portion 60, it is preferable that the enclosure portion 60 extends on the battery mounting side (where the battery packs 90 are mounted) along the direction intersecting with a direction of a plane along which the battery mount sections 20 are juxtaposed with each other. The position and the arrangement of the enclosure portion 60 may be changed as needed.

Further, according the above example, the mount section 40 for mounting the battery device 10 to the mount section 5 of the tool body 2 has a slide mechanism 21, so that the battery device 10 can be slide-mounted via the slide mechanism 21 to the mount position onto the tool body 10. The mount section 40 includes the engaging mechanism 51 for engaging the tool body 2 when the battery device 10 is in the mount position. The engaging mechanism 51 preferably includes the operation portion 55 used for releasing the tool body 2. The operation portion 55 preferably includes the pushing force receiving surface 56 that can be pushed for operating the operation member 55. The pushing force receiving surface 56 extends substantially in the mounting direction. Therefore, the engaging mechanism 51 can hold the battery device 10 at the mount position with respect to the tool body 2 after the battery device 10 has been moved to the mount position. In addition, because the pushing force receiving surface 56 extends substantially in the mounting direction, the size of the battery device 10 in the direction perpendicular to the mounting direction can be minimized. It can be minimized even with the addition of the operation portion 55 of the engaging mechanism 51. Therefore, the size of the battery device 10 can be minimized even with the inclusion of the engaging mechanism 51 for holding the battery device 10 at the mount position.

Pushing the pushing force receiving surface 56 may move the male hook portion 53 to move in a direction opposite the protruding direction, so that the male hook portion 53 may be disengaged from the female hook portion of the tool body 2. Because the pushing force receiving surface 56 extends substantially perpendicular to the protruding direction of the male hook portion 53, the pushing force may be applied in the same direction as the moving direction of the male hook portion 53. Therefore, the operation for releasing engagement of the male hook portion 53 can be performed easily and efficiently.

In addition, the pushing force receiving surface 56 preferably has a length in the mounting direction (i.e., the sliding direction or the forward and rearward directions) of the battery device 10. It preferably has a width (in the left and right direction) in a direction perpendicular to the mounting direction. Because the length is set to be longer than the width, the pushing operation on the pushing force receiving surface for releasing the male hook portion can be facilitated.

Further, the marker 65 is preferably disposed on the upper side opposite to the backside of the battery device 10 where the mount section 40 for mounting to the tool body 2 is disposed. The marker 69 serves as a target for movement of the mount section 40 relative to the tool body 2 when the mount section 40 is mounted to the tool body 2. Therefore, the user can smoothly attach the mount section 40 to the tool body 2 as he or she views the marker 69. Therefore, the operation for mounting the battery device 10 to the tool body 1 can be easily performed without having to look at the region between the battery device 10 and the tool body 2.

The marker 65 preferably includes two marker lines defined by the opposite end edges 651 and 652 of the marker 65. The battery device 10 can be mounted to the tool body 2 by moving the battery device 10 towards the marker lines. In this way, mounting the mount section 40 to the tool body 2 can be further easily performed. The end edges 651 and 652 serving as the marker lines are preferably spaced from each other by a distance corresponding to a width of the battery pack 90 or another battery pack having a rating voltage of 36 V. The tool body 2 preferably has markers 5a and 5b spaced from each other by a distance corresponding to the width of the battery pack 90 or another battery pack described above. Therefore, the markers 5a and 5b of the tool body 2 may be used when mounting the battery device 10 to the tool body 2 and may be also used when a single battery pack is directly mounted to the tool body 2.

In previous embodiments, a main control circuit board 62 transforms the output voltage of the 18 V from the battery packs 90 into a voltage of 36 V that is supplied to the mower body 2. In a similar fashion, other control circuit boards, such as a control circuit board for controlling a displaced device associated with the battery device 10, may be positioned within the enclosure portion 60. Thus, in addition to the main control circuit board 62, the battery device 10 may include an auxiliary control circuit board(s) for performing any other control related to the battery device 10.

Furthermore, the upper end surface 601 of the enclosure portion 60 and the upper surfaces 901 of the battery packs 90 mounted to the battery mount sections 20 have been described. The surface of the enclosure portion 60 and the surfaces of the battery packs 90 may extend substantially within the same plane. The left side surface 602 may extend within substantially the same plane as the left side surface 902 of the left side battery pack 90. Similarly, the right side surface 602 may extend within substantially the same plane as the right side surface 902 of the right side battery pack 90. With this arrangement, it is also possible to place the battery device 10 on a surface in a stable manner.

Furthermore, although the above examples have been described in connection with the lawn mower 1, the above teachings can also be applied to other battery driven electric tools, such as battery driven chain saws.

What is claimed is:

1. A battery carrier configured to be mounted to a tool body of an electric tool for supplying electric power to the tool body, comprising:
   a plurality of battery mount sections disposed at a first surface of the battery carrier and each configured to hold a battery;
   a tool body mount section disposed at a second surface of the battery carrier opposite to the first surface and configured to be mounted to the tool body;
   a marker disposed at the first surface and serving as a target for movement of the tool body mount section relative to the tool body when the tool body mount section is mounted to the tool body;
   the tool body mount section including a first slide mechanism configured to slide in a first sliding direction along the tool body; and
   a first case portion including the plurality of battery mount sections and the tool body mount section;
   a second case portion extending from the first case portion in a direction away from the first surface; and
   the marker protruding from an end surface of the second case portion and having opposite ends in a direction perpendicular to the sliding direction, the opposite ends defining marker lines; and
   the marker lines extending parallel to the first sliding direction.

2. The battery carrier according to claim 1, wherein
the first surface includes a front portion and a rear portion with respect to the first sliding direction, and
the marker is disposed at the front portion of the first surface.

3. The battery carrier according to claim 2, wherein
the marker is positioned on a front side of the batteries with respect to the first sliding direction when the batteries are mounted to the plurality of battery mount sections.

4. The battery carrier according to claim 3, wherein
each of the plurality of battery mount sections includes a second slide mechanism configured such that the battery is slid in a second sliding direction along the first surface, and
the second sliding direction is parallel to the first sliding direction.

5. The battery carrier according to claim 3, wherein:
the second case portion forms an enclosure portion disposed at the front portion of the first surface of the battery carrier and protruding from the first surface;
the enclosure portion is positioned on the front side of the batteries with respect to the first sliding direction when the batteries are mounted to the plurality of battery mount sections; and
the marker is disposed at the enclosure portion.

6. The battery carrier according to claim 5, wherein
the enclosure portion includes a first end and a second end in a direction perpendicular to the first surface, the first end being positioned on a side of the first surface and the second end being opposite to the first end, and
the marker is disposed at the second end of the enclosure portion.

7. The battery carrier according to claim 1, wherein
the end surface includes a first edge and a second edge opposite to each other in a direction substantially perpendicular to the first sliding surface, and
the marker is defined by the first and second edges.

8. The battery carrier according to claim 5, wherein
the enclosure portion has a longitudinal length in a direction substantially perpendicular to the first sliding direction.

9. The battery carrier according to claim 5, wherein
the enclosure portion defines an internal space that accommodates a control circuit board, and
the control circuit board is configured to control an output voltage of the batteries.

10. The battery carrier according to claim 1, wherein
the marker lines extend parallel to each other.

11. The battery carrier according to claim 10, wherein
the marker lines include a first maker line and a second marker line displaced from each other by a distance corresponding to a width of one battery.

12. The battery carrier according to claim 1, wherein
a tool-side marker is disposed at the tool body to correspond to the marker line of the battery carrier, and
the marker line of the battery carrier is arranged such that the tool-side marker is aligned with the marker line in the first sliding direction when the battery carrier is mounted to the tool body.

13. The battery carrier according to claim 1, wherein
the plurality of battery mount sections are arranged in a juxtaposed relationship along the first surface.

14. The battery carrier according to claim 1, wherein
the first case portion and the second case portion of the case jointly form a substantially L-shape as viewed from a side view.

* * * * *